(12) United States Patent
Sandacz

(10) Patent No.: US 9,662,627 B2
(45) Date of Patent: May 30, 2017

(54) RISER REACTOR WITH FLOW DISRUPTORS

(75) Inventor: Michael S. Sandacz, Glen Ellyn, IL (US)

(73) Assignee: UOP LLC, Des Plaines, IL (US)

(*) Notice: Subject to any disclaimer, the term of this patent is extended or adjusted under 35 U.S.C. 154(b) by 529 days.

(21) Appl. No.: 13/284,419

(22) Filed: Oct. 28, 2011

(65) Prior Publication Data

US 2013/0108519 A1 May 2, 2013

(51) Int. Cl.
*B01J 8/18* (2006.01)
*F27D 1/10* (2006.01)
*F27D 1/14* (2006.01)
*C10G 11/18* (2006.01)
*B01J 8/34* (2006.01)
*B01J 19/02* (2006.01)

(52) U.S. Cl.
CPC .......... *B01J 8/1845* (2013.01); *B01J 8/1872* (2013.01); *B01J 8/34* (2013.01); *B01J 19/02* (2013.01); *C10G 11/18* (2013.01); *F27D 1/10* (2013.01); *F27D 1/14* (2013.01); *F27D 1/141* (2013.01); *B01J 2208/00938* (2013.01); *B01J 2219/024* (2013.01)

(58) Field of Classification Search
CPC ............... F27D 1/10; F27D 1/14; F27D 1/141
USPC ........................................................ 422/241
See application file for complete search history.

(56) References Cited

U.S. PATENT DOCUMENTS

| | | | | |
|---|---|---|---|---|
| 3,353,925 A * | 11/1967 | Baumann et al. | ............. | 422/214 |
| 4,926,003 A | 5/1990 | Harandi et al. | | |
| 4,988,653 A | 1/1991 | Herbst et al. | | |
| 6,027,696 A | 2/2000 | Das et al. | | |
| 6,146,519 A | 11/2000 | Koves | | |
| 7,964,157 B2 | 6/2011 | Dries et al. | | |
| 2007/0261992 A1* | 11/2007 | Roux et al. | ................... | 208/113 |
| 2010/0034711 A1* | 2/2010 | Dries et al. | ................... | 422/145 |

FOREIGN PATENT DOCUMENTS

| | | | |
|---|---|---|---|
| AT | 374917 B * | 6/1984 | |
| EP | 180553 A1 * | 5/1986 | |

OTHER PUBLICATIONS

Thermal Ceramics. Anchoring of Monolithic Refractories: Design and Installation Manual. Dec. 2002.*
Refractory Anchors, Inc. Item # RA-39, REF-LOC. REV: A, dated Jul. 20, 2006.*
Machine translation for AT 374917 B (Jun. 1984).*
Moss et al. Pressure Vessel Design Manual, Fourth Edition. 2013. Procedure 6-4: Design of Vessels with Refractory Linings. Pages 406-418.*
Hall, T., Erosion-Resistant Refractories for Thin-Wall Linings, Energy Process., Can. V73 N.6 53 (Jul.-Aug. 1981), v 73, n 6, p. 53, Jul. 1981; ISSN: 03195759; Publisher: Northern Star Communications.

(Continued)

*Primary Examiner* — Jennifer A Leung

(57) ABSTRACT

An embodiment of the invention includes a riser reactor for reacting a feedstock and catalyst. The riser reactor wall defines an interior. A continuous refractory lining is attached to the reactor wall and defines a plurality of flow disruptors that extend inward from the wall into the reactor interior and disrupt flow patterns of the feedstock and catalyst.

16 Claims, 4 Drawing Sheets

(56) References Cited

OTHER PUBLICATIONS

Zhong, X.; Hou, S.; Zheng, M.; Xu, K.; Li, S., Study on flow hydrodynamics of anti-down-slipping riser, Petroleum Processing and Petrochemicals, v 31, n 7, p. 45-50, Jul. 2000; ISSN: 10052399; Publisher: SINOPEC, Research Institute of Petroleum Processing.

* cited by examiner

RISER REACTOR WITH FLOW DISRUPTORS

FIELD OF THE INVENTION

A field of the invention is catalytic cracker riser reactors. Another field is catalytic cracker riser reactors having flow disruptors.

BACKGROUND OF THE INVENTION

The fluid catalytic cracking (FCC) process is well known for conversion of relatively high-boiling hydrocarbons to lighter hydrocarbons. In many catalytic cracking reactors, often referred to as riser reactors, risers or pipe reactors, a long chain hydrocarbon feed reacts with a catalyst to produce shorter chain products. This can be referred to as cracking the feed. The feed and fluidized catalyst are introduced at a lower entrance to the vertical riser, and travel vertically upwards within the riser reacting at very high temperatures until they reach an upper exit. The riser is often internally lined to minimize heat loss and resist erosion/corrosion.

Reaction efficiency in the riser depends, among other factors, on good and uniform mixing between the feedstock and fluidized catalyst. It is desirable that the feed be uniformly dispersed in a stream of fluidized catalyst that is moving up the riser. In many risers, however, even if near uniform dispersion is achieved at the riser entrance, non-uniform mixing can occur as the materials travel upwards due (at least in part) to non-uniform cross sectional gas velocities that result from temperature differentials and other factors. In some risers, for example, the upward velocity of feedstock is lower near the riser wall and higher near the center. This non-uniform velocity profile may be referred to as reactor slip. Under such conditions, more dense fluidized catalyst tends to concentrate near the wall in the slower velocity feedstock. This leads to lowered reaction efficiency and yield.

Some attempts have been made to improve mixing along the vertical flow path of the riser. For example, obstacles such as baffles or other contact devices have been proposed to create turbulence and cause more uniform mixing in the riser. However, proposals to date have suffered various problems and disadvantages. Many relate to erosion and/or corrosion. The riser creates a highly corrosive and erosive environment that combines high temperatures and a high flow rate of chemically active materials. Other problems relate to temperature differentials of contact devices. Metal baffles and the like are subject to temperature gradients along their length. Such gradients can lead to mechanical stresses and failures and can even lead to condensation of reactants on the baffle in extreme cases.

SUMMARY OF THE INVENTION

An embodiment of the invention includes a riser reactor for reacting a feedstock and catalyst. The riser reactor wall defines an interior. A continuous refractory lining is on the reactor wall and defines a plurality of flow disruptors that extend inward into the reactor interior and disrupt flow patterns of the feedstock and catalyst.

DETAILED DESCRIPTION OF THE DRAWINGS

DETAILED DESCRIPTION OF THE INVENTION

Embodiments of the present invention include riser reactors, with examples including catalytic cracking riser reactors, that show marked improvement over the prior art with regard to mitigating reactor slip, increasing conversion, and other benefits. This is achieved, at least in part, through novel flow disruptors that provide important benefits related to conversion, slip-resistance, corrosion resistance, thermal stability, and other factors that effect reaction efficiency.

Figure 1:
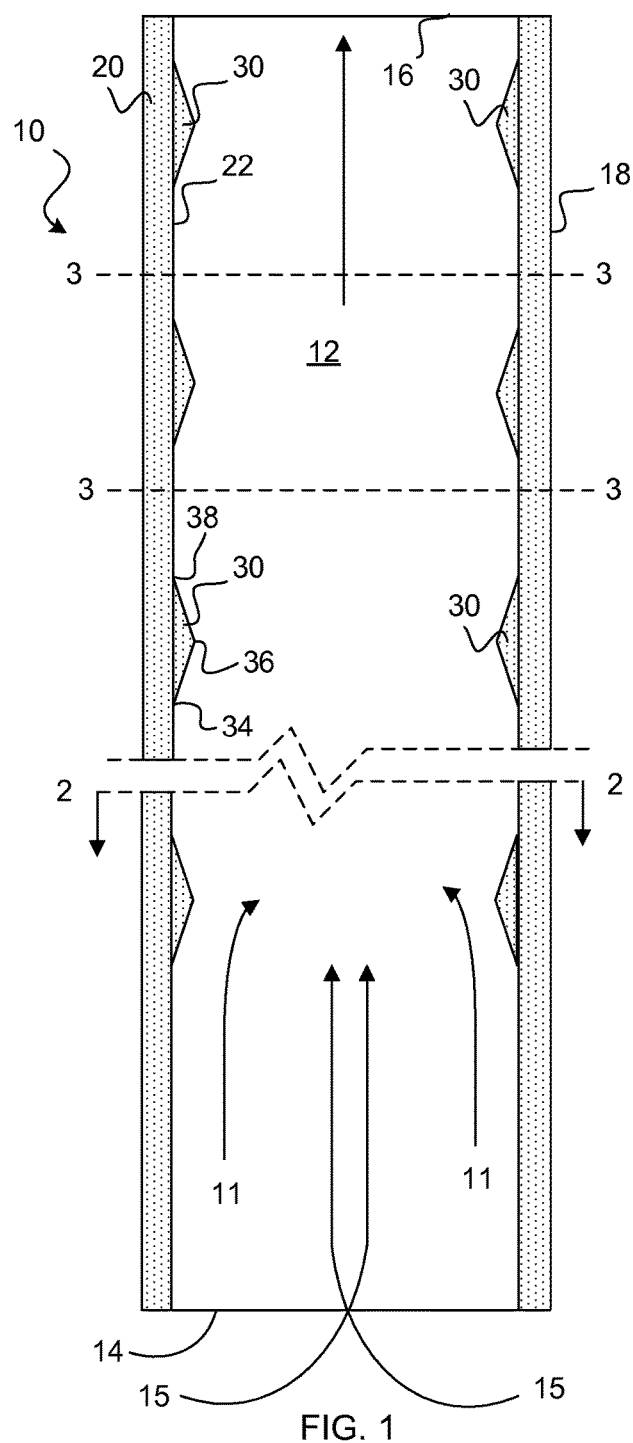
FIG. 1 is a cross section schematic diagram of an example riser reactor of the invention.
Figure 2:
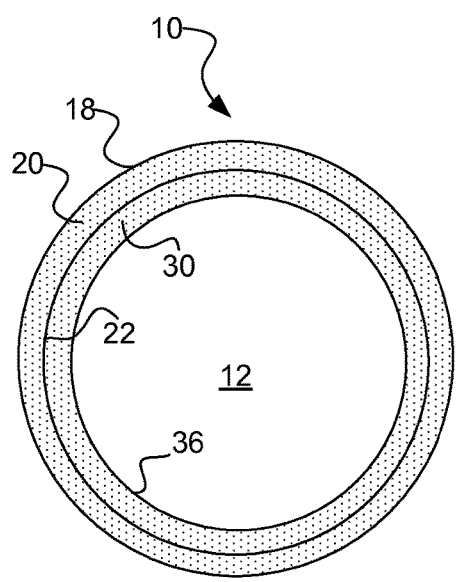
FIG. 2 is a cross section schematic diagram of the example riser reactor of FIG. 1 viewed from the perspective of line 2-2 of FIG. 1 in the direction shown.

FIG. 1 schematically illustrates a cross section of an example riser reactor 10 of the invention, while FIG. 2 is an overhead plan view of the same reactor 10 viewed from the perspective of the line 2-2 in the direction indicated by the arrows. The reactor 10 has been illustrated schematically for purposes of clarity and brevity, with elements not important to consideration of the present invention not included. The reactor 10 may be, for example, a catalytic cracking reactor used to convert relatively long chain organics to shorter chain products. The riser reactor 10 is generally cylindrical shaped and can be referred to as a pipe reactor. It rises vertically, with feedstock (flow indicated generally at arrow 11) and catalyst (indicated generally at arrow 15) fed to a reactor interior 12 at a lower entrance 14. The catalyst and feedstock react with one another as they flow vertically through the reactor 10 and a product(s) is removed at an upper exit 16. The feedstock may be fluidized in the flowing catalyst.

The reactor 10 includes a generally cylindrical side wall 18 that circumferentially surrounds the interior 12 and extends from the entrance 14 to exit 16, with a lining 20 on the interior of the wall 18. The lining 20 provides thermal and abrasion resistance, and may extend over all or a portion of the reactor 10 operational length between the entrance 14 and exit 16. The reactor 10 may operate at high or even extremely high temperatures, and further includes flowing reactive catalyst. These and other factors can lead to a highly corrosive environment. Also, minimizing heat losses, minimizing side wall 18 temperatures, and maintaining desired temperature in the reactor interior 12 can be important for operational reasons. The lining 20 is useful to address these and other considerations.

In many embodiments, the entire lining 20 is, or at least significant portions of it are, continuous. As used herein, the term continuous is intended to broadly refer to a condition of being substantially free from seams or other breakages in construction.

The reactor lining 20 has an interior surface 22 that is generally parallel with the wall 18. The lining thickness between interior surface 22 and side wall 18 may vary with application and other factors, but in many applications will be between about 2 and 12 inches (between about 5.1 and 30.5 cm). In some catalytic cracker reactors, thickness of from 3-5 inches (7.6-12.7 cm) may be useful. The lining 20 includes a plurality of flow disruptors 30 on the interior surface 22. The flow disruptors 30 extend inward from the interior surface 22 into the reactor interior 12. As illustrated by FIG. 2, the flow disruptors 30 extend circumferentially about the circumference of the interior 12, but are not limited to extending the full circumference as shown. The flow disruptors 30 are configured to disrupt the flowpath of the feedstock and/or catalyst as they rise through the reactor 10 as is generally illustrated by the schematic upward pointing flowpath arrows shown in FIG. 1 (and FIG. 3).

As the feedstock and catalyst flow through the reactor 10, parabolic flow patterns can develop with slower velocities nearest the wall 18. The heavier catalyst tends to concentrate in this slower flowing region nearest the wall 18. This can lead to a non-uniform feedstock/catalyst distribution, non-uniform thermal distribution, reduced conversion, reduced efficiency, and other disadvantages. The flow disruptors 30 of the invention are useful to mitigate or eliminate these problems by disrupting flow patterns near the wall 18.

The flow disruptors 30 may have a variety of shapes and sizes. Example flow disruptors 30 have a general triangle shape when viewed from the perspective of FIG. 1, and generally geometrically favor a triangulated venturi style flow restriction. Traveling along the direction of flow, the flow disruptor 30 extends gradually inward (into the reactor interior 12) from a lower leading edge 34 on the lining surface 22 to an innermost peak 36, and then gradually retreats toward the wall to an upper trailing edge 38 on the lining surface 22. In some embodiments, the leading and trailing edge angles are the same so that a generally obtuse isosceles triangle shaped disruptor 30 is formed. Although the peak 36 has been illustrated as a point where two lines intersect, in practice it may be rounded or take other shapes. Also, other disruptors of the invention may adopt different shapes than that shown for example flow disruptor 30. The lining 20 includes and is continuous with flow disruptors 30, and in many embodiments are made of the same refractory material.

Figure 3:
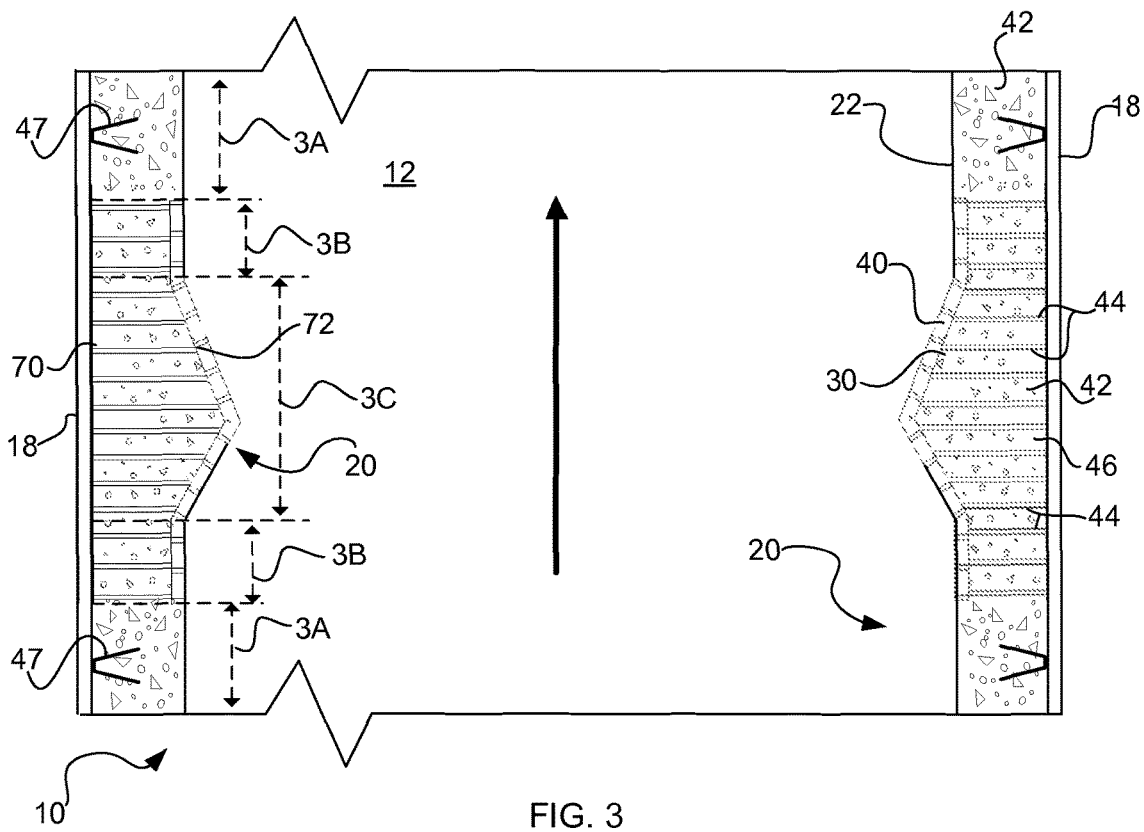
FIG. 3 is a cross section schematic diagram showing a portion of an example riser reactor of the invention including flow disruptors.

FIG. 3 shows a more detailed cross section of the portion of the reactor 10 identified between dashed lines 3-3 in FIG. 1 (with flow in the general direction of the arrow). The flow disruptors 30 include a mesh 40 with a refractory material 42 cast throughout the mesh 40. The mesh 40 is attached to the sidewall 18 by a plurality of standoff rods 44. A space 46 may be defined between the mesh 40 and sidewall 18, with the refractory material 42 filling the space 46. The mesh 40 and standoff rods 44 provide enhanced mechanical strength to the lining 20 in portions that include the flow disruptors 30. Other portions of the lining 20 in the example reactor 10 do not include the mesh 40, but instead feature refractory material 42 cast directly on the reactor side wall 18.

This is illustrated in the schematic of FIG. 3 which generally illustrates three different sections of the lining: 3A, transition section 3B and flow disruptor section 3C (illustrated using corresponding dashed line arrows). In section 3A, no flow disruptor 30 is present and refractory material 42 is directly cast onto reactor side wall 18. A plurality of V shaped anchors 47 are welded onto the side wall 18 in these sections to enhance holding power and mechanical strength of the lining 20. The V shaped anchors 47 may be made of metal or other material, with one example being 310 stainless steel. They can be welded to the wall 18, and as indicated are completely enveloped by the refractory material 42.

Transition sections 3B and flow disruptor section 3C include the mesh 40. (For convenience, in some embodiments these two sections in combination may be considered a single section with two subsections—a transition section (3B) and a flow disruptor section (3C)). These sections of the lining 20 may be exposed to heightened levels of corrosive and erosive wear in operation due to their geometry. The mesh 40 is provided to increase mechanical strength for these sections 3B and 3C. Transition section 3B can extend in the direction of the flowpath for any suitable length, with examples including from 2-5 inches (5.1-12.7 cm). In some embodiments 3 inches (7.6 cm) is used. In some embodiments, the transition sections 3B are eliminated, with section 3A instead extending to section 3C. In some other embodiments, sections 3A may be eliminated with the lining instead including only sections 3B and 3c and the entire lining therefore provided with mesh 40. Importantly, in many embodiments the refractory material is continuous between sections 3A, 3B and 3C with no seams or other disruption in interior surface 22 or other portions. In many embodiments, the same refractory material 42 is used for each section. Even in some embodiments where different refractory material 42 is used, it may be cast at the same time for purposes of a continuous final lining 20. This advantageously reduces mechanical failure points and provides other advantages.

Suitable materials for use as the refractory material 42 are those that provide good thermal insulation and abrasion resistance. Many are castable. A wide variety of suitable materials are known, including standard Portland cement as well as numerous more highly engineered materials. Many (but not all) refractory materials are inorganic, nonmetallic, porous and heterogeneous materials comprising thermally stable mineral aggregates, a binder phase and one or more additives. They may comprise one or more of silica, alumina, calcium oxide, titanium oxide, iron oxide, magnesium oxide, zirconium and others. Different compositions can be selected for different applications, with design considerations including degree of thermal and abrasion resistance needed. Examples include higher abrasion resistant refractory materials in sections of the lining that may be subject to significant abrasion.

Example lightweight commercial refractory products include, but are not limited to: those having:
 iron oxide content less than 3.5% (by weight) and aluminum oxides are greater than 33% (by weight)
 service temperature ratings of at least 2400° F. (1315° C.)
 density after heating to 1500° F. (815° C.) and cooling to ambient is between 70-90 lb/ft$^3$ (1120-1440 kg/m$^3$) (as measured using ASTM C 134 testing procedure)
 cold crushing strength after heating to 1500° F. (815° C.) and cooling to ambient of at least 600 psi (42 kg/m$^2$) (as measured using ASTM C 133 testing procedure)
 thermal conductivity at a mean temperature of 1000° F. (540° C.) between about 2.30-3.00 BTU-in/ft$^2$-h-F° (0.35-0.45 W/m° C.)

Example midweight commercial refractory products include, but are not limited to: those having:
 iron oxide content less than 1.0% (by weight) and aluminum oxides are greater than 35% (by weight)
 service temperature ratings of at least 2400° F. (1315° C.)
 density after heating to 1500° F. (815° C.) and cooling to ambient is between 100-145 lb/ft$^3$ (1600-2320 kg/m$^3$) (as measured using ASTM C 134 testing procedure)

cold crushing strength after heating to 1500° F. (815° C.) and cooling to ambient of at least 6000 psi (420 kg/m$^2$) (as measured using ASTM C 133 testing procedure)

thermal conductivity at a mean temperature of 1000° F. (540° C.) between about 5.3-10.0 BTU-in/ft$^2$-h-F° (0.75-1.15 W/m° C.)

Example high abrasion resistance products with higher abrasion resistance include (but are not limited to) those having:

iron oxide content less than 1.0% (by weight) and aluminum oxides are greater than 80% (by weight)

service temperature ratings of at least 2300° F. (1260° C.)

density after heating to 1500° F. (815° C.) and cooling to ambient of at least 155 lb/ft$^3$ (2480 kg/m$^3$) (as measured using ASTM C 134 testing procedure)

cold crushing strength after heating to 1500° F. (815° C.) and cooling to ambient of at least 12,000 psi (845 kg/m$^2$) (as measured using ASTM C 133 testing procedure)

To further increase mechanical strength, refractory materials may be provided with reinforcing fibers made of metal, ceramic or other materials. A variety of different fibers will be useful depending on application. In many invention embodiments, such fibers will comply with ASTM (American Society for Testing and Materials) A 820, be made of 304 Stainless Steel, and be about ¾ inch (1.9 cm) long and 20 mil (0.5 mm). Fibers can be of uniform shape and size and may be configured to avoid clumping, may be made from metal or polymers.

Figure 4:
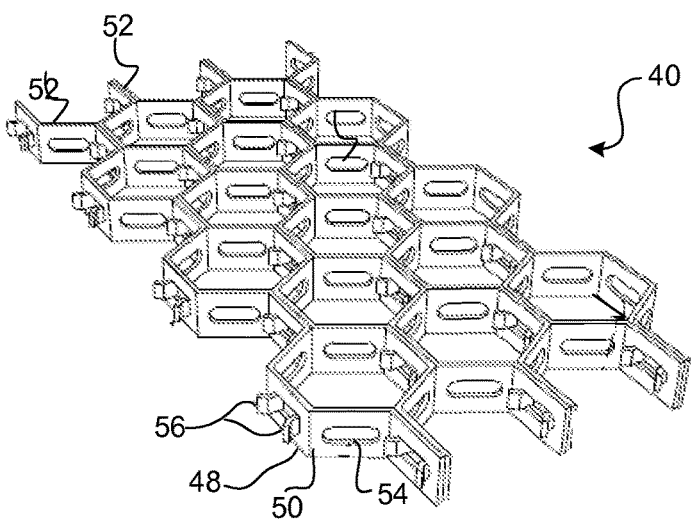
FIG. 4 is a perspective view of an example mesh.

The mesh 40 may be made of metal and may take any of a number of useful forms. The mesh 40 may be latticed or cross-linked to provide holding power on the refractory material 42 and to otherwise increase resistance. Too extensive of a mesh 40, however, can result in high levels of heat transfer. Many invention embodiments achieve a useful balance between these and other competing factors through adoption of a repeating pattern of open cells. The cells may be polygons, circles or other shapes. FIG. 4 illustrates one portion of an example mesh 40 in which the cells are configured as hexagons 48.

The mesh 40 includes individual metal strips 52 which are bent to form partial hexagons 48. When adjacent strips 52 are attached to one another the series of hexagons 48 are formed. The strips 52 have a width and thickness as desired. In some embodiments the thickness is 10, 12 or 14 gauge (0.13, 0.11 or 0.075 inches, respectively; 2.59, 2.05 or 1.63 mm, respectively). Strips 52 when assembled define hexagon walls 50 having a width (which defines the hexagon wall height or hexagon depth in the perspective of FIG. 4) as desired, with useful ranges including between 0.5 and 3 inches (between 1.27 and 7.62 cm), with 1 inch (2.54 cm) being one example. The hexagon 48 can have a diameter as desired, with balances struck between smaller diameters that are beneficial to increase mechanical strength and larger diameters that reduce heat transfer and lower costs. Useful ranges in many applications include a diameter of between 1 and 3 inches (between 2.54 and 7.62 cm), with 1⅞ inch (4.76 cm) being one particular example.

It will once again be appreciated that a wide variety of mesh 40 configurations can be used in invention embodiments, which can include a wide variety of polygon, circle or other open cell shapes. The hexagons 48 have been discovered to provide particular utility in that flat surfaces from adjoining strips 52 are coplanar for ease of attachment, and because they provide a good balance of mechanical strength, low weight, heat transfer, and other properties.

The strips 52 can be made of any suitable material, with balances again struck between those that provide good mechanical strength and corrosion resistance and those that provide better heat transfer characteristics. Metals such as stainless steel are one useful example. Passages 54 are provided on the strips 52 along with engaging tabs 56 that cooperate with passages 54 from adjacent strips 52. The hexagons 48 are formed by locking strips together when engaging tabs 56 are passed through a passage 54 and folded over to lockingly engage an adjoining strip 52. Tabs 56 may be formed as desired, with one useful construction including bendable formations cut out from a strip 52.

Figure 5:
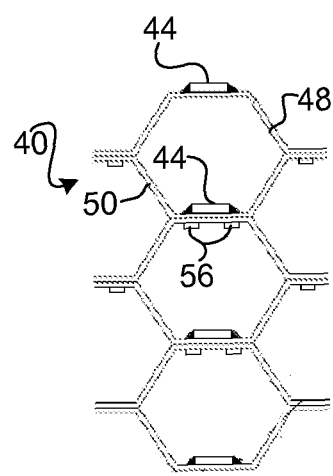
FIG. 5 is an overhead plan schematic view of a portion of an example mesh.

Locking a plurality of adjacent strips 52 together will result in formation of a mesh 40 in a size as desired having hexagons 48 arranged generally in rows and columns, with FIGS. 4 and 5 illustrating two example mesh 40 sections. The joining of adjacent strips 52 sections may have sufficient freedom of movement to allow the mesh 40 to be fit into a desired shaped application including matching the cylindrical shape of reactor wall 18. In some embodiments, in addition to tabs 56, adjacent strips 52 may also be welded, bolted, or otherwise joined to one another at a desired orientation in some embodiments. Referring again to FIG. 3, mesh sections having a different planar orientation, with examples being at the leading edge 34, trailing edge 38 and peak 36 (FIG. 1), may be joined to one another by welding, fastening with tabs or brackets, or in other ways. In some embodiments the sections are not mechanically joined to one another.

When the mesh 40 is attached to the sidewall 18 and refractory material 42 cast thereon, the refractory material 42 fills the open centers of the hexagons 48, the passages 54, the space 46, and envelops the standoff rods 44. The skeletal structure formed by the standoff rods 44 and mesh 40 provides significant mechanical strength, holding power, refractory anchorage, corrosion resistance, and other advantages to maintain the refractory material 42 in place for extended periods even when under significant operational stress.

Importantly, many invention embodiments achieve useful benefits and advantages through continuous refractory material 42 between lining sections 3A, 3B and 3C of FIG. 3. Unlike some prior art configurations, the same refractory lining 20 covers the entire reactor interior 12, with no disruptions, seams or other structural features that risk corrosion, erosion, disadvantageous heat transfer, other differential thermal growth, and other disadvantages. This improves upon mechanical failures that occurred in many prior art configurations, provides improved heat transfer characteristics, and provides other important benefits over the prior art.

In the lining transition sections 3B, the hexagons 48 have a major axis (parallel to the hexagon wall 50) that is generally perpendicular to a major axis of the reactor 10 (which is generally parallel to the flowpath). That is, the hexagons 48 are perpendicular to the wall 18. In the lining flow disruptor sections 3C, the major axis of the hexagon 48 (again parallel to the hexagon wall 50) is not parallel to the reactor major axis, but instead is oriented at an angle thereto as illustrated. The orientation in these sections will depend on whether the respective hexagon is on the leading or trailing edge side of the flow disruptor 30.

Because a relatively high erosive and/or corrosive environment will be present in operation, the refractory material used to form the lining transition sections 3B and flow disruptor sections 3C may be abrasion resistant or mid density refractory materials as defined above. Different refractory material, with an example being low density refractory material may or may not be used to form the lining sections 3A. If a different refractory material is used in sections 3A as compared to 3B/3C, the respective materials can be cast at the same time (or closely similar time) so that they bond with one another and form a continuous lining 20 that is free from seams between sections.

Figure 6:
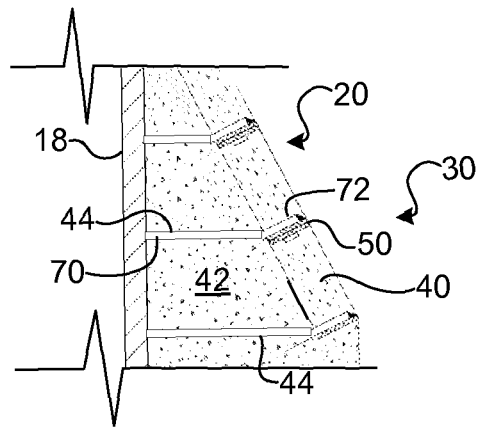
FIG. 6 is a cross section showing a portion of an example riser reactor of the invention including a portion of a flow disruptor.
Figure 7:
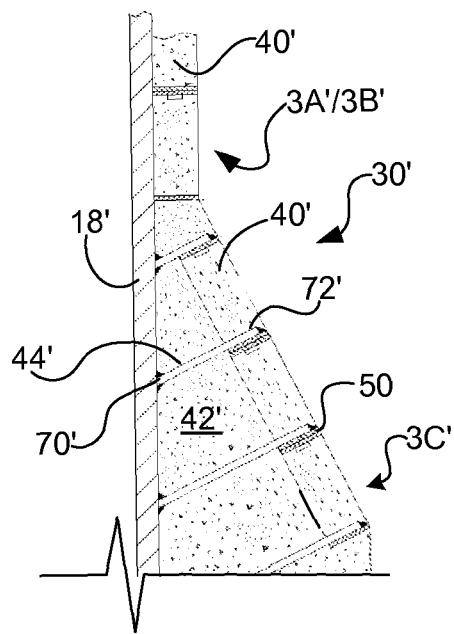
FIG. 7 is a cross section showing a portion of an example riser reactor of the invention including a portion of a flow disruptor; and, FIGS. 8-10 each illustrate a representative schematic view of portions of example meshes of the invention including connection points.

As best illustrated by FIG. 3, the mesh 40 is supported by a plurality of standoff bars 44 that are fixed on the reactor side wall 18. Standoff bars 44 may be configured as desired, with a balance once again struck between the competing interests of mechanical strength versus excessive heat conduction and cost. In some embodiments, the bars 44 are generally configured as strips with a rectangular cross section made of light gauge stainless steel or other metal, with gauges of 10, 12 and 14 being some examples of suitable materials for the thickness and with a width of between about ¼ inch (6.35 mm) and about 1.5 inches (3.81 cm). In FIGS. 6 and 7, A first end 70 of the standoff bars 44 is attached to the reactor side wall 18 by welding, fastening with a bolt or other fastener, or the like. A distal inner end 72 of the standoff bars 44 is connected to the mesh 40.

As best shown by the expanded cross section view of a portion of a flow disrupter 30 of FIG. 6, mesh hexagon walls 50 are attached to rectangular shaped bar inner end 72. In some other embodiments, other attachment of the hexagon 48 to the bar 44 can be provided, including for example use of a fastener, or other. In the embodiment illustrated in FIG. 3, the standoff bars 44 extend perpendicularly to the wall 18, to the reactor main axis and to the flow path. As best illustrated in the partial cross section view of FIG. 6, the bars 44 may have a bent portion close to their interior end 72 for planar engagement with the hexagon wall 50.

In other embodiments, with a representative portion of one illustrated in FIG. 7, the standoff bars 44' (prime element numbers used for convenience that generally correspond to similar elements of other FIGS.) are at a non-90° angle relative to the wall 18' in disrupter lining sections 3C'. In these sections 3C', the standoff bars 44' are coextensive with the angled orientation of the hexagon wall 50'. The example embodiment partially illustrated in FIG. 7 also shows that no space exists between the mesh 40' and wall 18' in section 3A' or 3B', with the mesh 40' instead extending directly to the wall 18'. In these embodiments, no standoff rods 44' may be necessary in these sections, with the mesh 40' instead attached directly to the wall 18' using welds, fasteners or other connection means.

Figure 8:
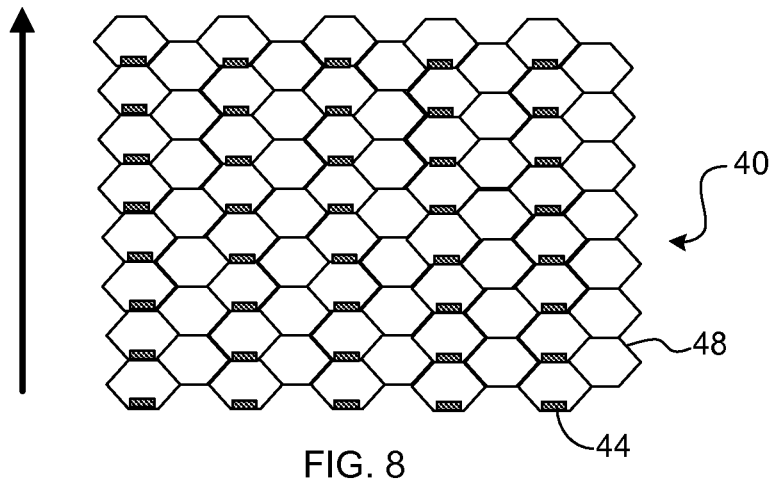
Figure 9:
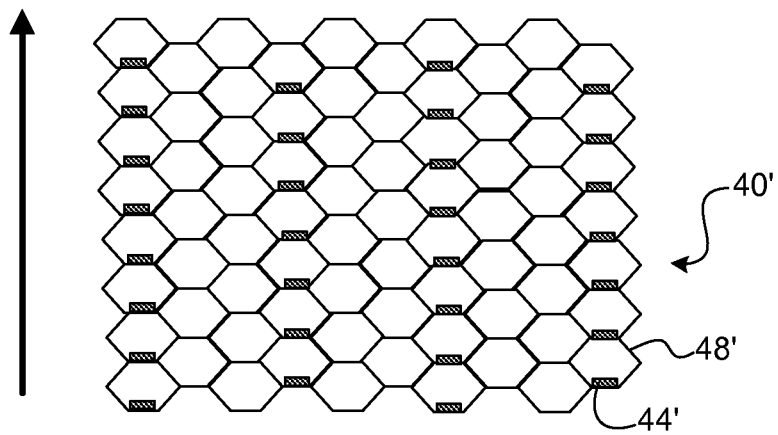
Figure 10:
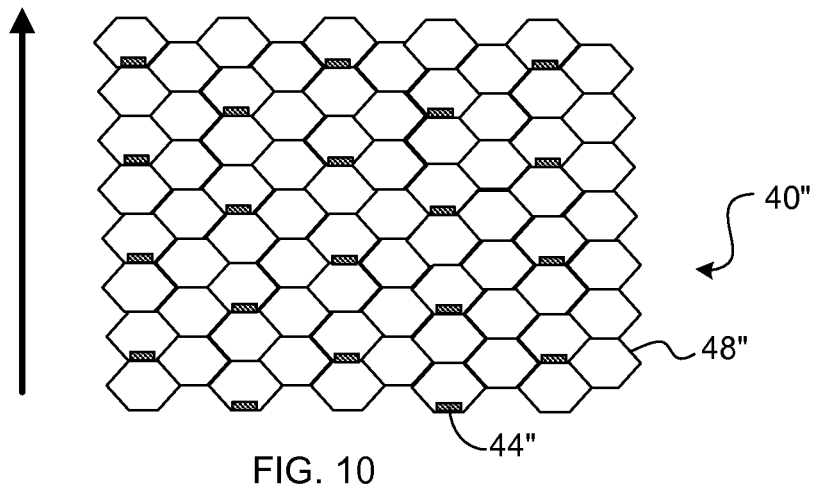

Referring again to FIG. 3, the number and placement of standoff rods 44 is subject to design considerations. A balance must again be struck between competing interests: high mechanical strength (which favors a larger number of standoff rods) and low thermal transfer and costs (which favor fewer standoff rods). A large number of different variations are of course possible. In many embodiments, vertical orientation is favored over horizontal to increase resistance in the direction of flow, and also to avoid excessive heat loss in the radial direction. FIGS. 8-10 schematically illustrate a few different useful configurations. In each of these FIGS., hexagons 48 (all element numbers in FIGS. 9-10 illustrated using prime and double prime designations for convenience) can be considered to be arranged in a grid pattern having vertical columns and horizontal rows for convenience. Flow is in the upward direction as generally shown by the arrow included in each of FIGS. 8-10.

FIG. 8 illustrates an embodiment in which each hexagon 48 down every other vertical column of hexagons 48' are attached to a standoff rod 44, and in which every other hexagon 48 across a horizontal row is attached to a rod 44. In the embodiment of FIG. 9, each hexagon 48' down every third vertical column of hexagons 48' are attached to a standoff rod 44', and every third hexagon 48' across a horizontal row is attached to a rod 44'. FIG. 10 shows a more staggered connection approach with every other hexagon 48" down every third vertical column attached to a standoff rod 44", and in which every fourth hexagon 48" across a horizontal row is attached to a rod 44". Each of these and other configurations may be useful in various applications. In many typical cracker riser reactor applications, however, the configuration of FIG. 8 is believed to offer particular utility when using mesh 40 and rods 44 as described herein. Good balances of mechanical strength and heat conduction are achieved.

All of the configurations shown, as well as others that will be useful in other invention embodiments, offer advantages in that failure of one or only a few isolated of the standoff rods 44 is not likely to lead to a significant failure of the flow disruptors 30. The number and location of connected standoff rods 44 leads to a highly distributed mechanical support for the flow disruptors 30. Their continuous composition of the lining 20, including flow disruptors 30, further mitigates risk of failure based on erosion, corrosion or other problems with only one or a few of standoff rods 44.

It will be appreciated that description of example embodiments herein is made by way of illustration only, and that many variations within the scope of the invention are possible to the various embodiments and elements described herein. Description has been made by way of illustration and not limitation. Many alternates and equivalents will be apparent to those knowledgeable in the art.

What is claimed is:

1. A riser reactor for reacting a feedstock and catalyst, the reactor comprising:
   a riser reactor wall defining an interior, the wall interior has a substantially circular cross section; and
   a continuous refractory lining on the reactor wall, the refractory lining defining a plurality of flow disruptors that extend inward into the reactor interior and disrupt flow patterns of the feedstock and catalyst, the flow disruptors extend circumferentially around the circular cross section and portions of the lining that define the flow disruptors comprise a mesh attached to the reactor wall with refractory material cast thereabout, the refractory lining includes:
      first sections defining the flow disruptors, second sections that are immediately adjacent to the first sections, and third sections that are adjacent to the second sections but not adjacent to the first sections;
      the first and second sections comprise said mesh that defines a repeating pattern of open shapes with passages provided between adjacent shapes, the repeating patterns of shapes arranged in rows that extend circumferentially around the reactor interior and columns that extend vertically along the reactor interior; and
      the third sections include refractory material cast directly on the reactor wall without any mesh present;
   wherein a plurality of standoff bars connect the mesh that partially define the flow disruptors to the reactor wall, a space is defined between the mesh that partially define the flow disruptors and the reactor wall, and the standoff bars extend across this space with refractory material filling the space and enveloping the standoff bars, wherein the plurality of standoff bars vary in length and connects shapes in the vertical column to the reactor wall and the refractory material is cast about the mesh to fill the open shapes and passages and envelope the plurality of standoff bars.

2. A riser reactor as defined by claim 1 wherein third section of the refractory lining defines an interior surface that is substantially parallel to the reactor wall in regions between the flow disruptors, and wherein first sections of the refractory lining defines an interior surface that is not parallel to the wall where the flow disruptors are defined.

3. A riser reactor as defined by claim 1 wherein the feedstock and catalyst have a vertical flow pattern and wherein:
the flow disruptors extend inward from the wall into the interior with a generally triangular shaped profile along the vertical flow pattern that includes a vertical lower leading edge that rises to a center peak and then descends to a vertical upper trailing edge.

4. A riser reactor as defined by claim 3 wherein a first angle between the leading edge and the wall is substantially equal to a second angle between the trailing edge and the wall.

5. A riser reactor as defined by claim 1 wherein:
the feedstock and catalyst have a flow path that is along an axial direction of the wall.

6. A riser reactor as defined by claim 1 wherein the mesh comprises a repeating pattern of polygons, each polygon having an open center, wherein passages are provided between adjacent polygons, and wherein the refractory material fills the open centers and the passages.

7. A riser reactor as defined by claim 1 wherein:
the first sections of refractory lining that define the flow disruptors include the mesh that defines a repeating pattern of open shapes having a diameter of between about 1 and 3 inches, the shapes defined by walls having a wall height of between about 0.5 and 2 inches, and a thickness gauge of between 10 and 14, wherein the passages are provided in metal walls and cooperating engaging tabs provided in other metal walls for attaching the walls to one another; and,
the refractory material cast about the mesh to fill the open shapes and the passages provide holding power for the refractory material when it is cast about the mesh.

8. A riser reactor as defined by claim 1 and further including reinforcing structure attached to the reactor wall in the third sections that anchors and increasing mechanical strength of the refractory material.

9. A riser reactor as defined by claim 1, wherein the refractory lining comprises refractory material including one or more of silica, alumina, calcium oxide, titanium oxide, iron oxide, and magnesium oxide; and wherein the lining has a continuous interior surface.

10. A riser reactor for reacting a feedstock and catalyst, the reactor comprising:
a generally cylindrical riser reactor having an interior side wall and an interior;
a mesh attached to the interior side wall in at least first sections of the interior side wall;
refractory material cast about the mesh to form a lining on the interior side wall;
the refractory lining includes:
first sections defining the flow disruptors configured to disrupt flow patterns of the feedstock and catalyst, second sections that are immediately adjacent to the first sections, and third sections that are adjacent to the second sections but not adjacent to the first sections;
the first and second sections comprise the mesh that defines a repeating pattern of open cells with passages provided between adjacent cells, the repeating patterns of cells arranged in rows that extend circumferentially around the interior side wall and columns that extend vertically along the interior side wall; and
the third sections include refractory material cast directly on the interior side wall without any mesh present;
a plurality of standoff bars connecting the mesh to the interior side wall in the first sections, wherein the plurality of standoff bars vary in length and connects cells in the vertical column to the interior side wall and the refractory material is cast about the mesh to fill the open cells and the passages and envelope the plurality of standoff bars; and
a space defined between the interior side wall and the flow disruptors, the refractory material continuously filling the space, enveloping the standoff bars, and surrounding the mesh to define the flow disruptors.

11. A riser reactor as defined by claim 10 wherein the reactor has a generally vertical flow path, and wherein:
the mesh comprises patterned metal strips connected to define a plurality of open cells that are filled with the refractory material, the metal strips defining a cell wall that surrounds each of the open cells, the cell wall oriented generally perpendicular to the flow path in third sections of refractory lining that are between the flow disruptors, the cell walls oriented at a non-perpendicular angle to the flow path in first sections of refractory lining that define the flow disruptors.

12. A riser reactor as defined by claim 11 wherein the mesh is connected to the wall using the plurality of standoff bars, wherein cell walls are mounted on the standoff bars, the standoff bars coextensive with the cell walls wherein the standoff bars are generally perpendicular to the flow path in the third sections of refractory lining between the flow disruptors and are oriented at non-perpendicular angles to the flow path in the first sections of refractory lining that define the flow disruptors.

13. A riser reactor as defined by claim 10 wherein:
the second sections have an interior lining surface that is coplanar with a surface of the second section, and the flow disruptor comprises the first section located between second sections;
the mesh defines a repeating pattern of open cells in the first sections; and
the plurality of standoff bars connect the mesh to the interior side wall in the first sections.

14. A riser reactor as defined by claim 13 wherein:
the standoff bars have a generally rectangular cross section with a first end attached to the reactor wall and a distal second end connected to the mesh;
the standoff bars are oriented at a normal to the interior side wall; and,
the standoff bars are connected to the mesh in the first sections having a bent portion proximate to the second end to allow for planar engagement with the mesh.

15. A riser reactor as defined by claim 10 wherein:
the mesh comprises a repeating pattern of open cells, the cells including side walls with the passages and cooperating engaging tabs, the cells fastened to one another when engaging tabs from one cells foldingly engage the passages from an adjacent cells.

16. A riser reactor for reacting a feedstock and catalyst, the reactor comprising:

a generally cylindrical riser reactor having a reactor side wall and an interior that extends from a lower entrance to an upper exit;
a refractory lining covering at least a portion of the reactor side wall between the reactor entrance and exit and surrounding the interior, the refractory lining includes:
   first sections defining flow disruptors to disrupt flow patterns of the feedstock and catalyst, second sections that are immediately adjacent to the first sections, and third sections that are adjacent to the second sections but not adjacent to the first sections;
   the first and second sections comprise a mesh that defines a repeating pattern of open cells with passages provided between adjacent cells, the repeating patterns of cells arranged in rows that extend circumferentially around the side wall and columns that extend vertically along the side wall;
   the third sections include refractory material cast directly on the reactor side wall without any mesh present;
each of the lining flow disruptors comprising:
   the mesh attached to the reactor side wall that surrounds the interior, the mesh comprising a repeating pattern of open cells, passages connecting at least some of the open cells to adjacent open cells;
   a space defined between the side wall and the metal mesh;
   a plurality of standoff rods extending across the space and connecting at least some of the open cells to the reactor side wall;
   the plurality of standoff rods connecting at least some of the open cells to the reactor side wall, wherein the plurality of standoff rods vary in length; and,
   refractory material cast about the mesh and filling the open cells and the passages and enveloping the standoff rods, forming a lining on the reactor side wall.

* * * * *